United States Patent [19]

Asrar

[11] Patent Number: 4,975,507
[45] Date of Patent: Dec. 4, 1990

[54] CYCLOPENTANEDIOXOCARBONYL VINYLENE POLYMERS

[75] Inventor: Jawed Asrar, Wilbraham, Mass.

[73] Assignee: Monsanto Company, St. Louis, Mich.

[21] Appl. No.: 303,078

[22] Filed: Jan. 30, 1989

Related U.S. Application Data

[63] Continuation-in-part of Ser. No. 54,656, May 27, 1987, abandoned.

[51] Int. Cl.$^5$ .............................................. C08F 24/00
[52] U.S. Cl. ..................................... 526/269; 526/281
[58] Field of Search ........................ 526/269, 281, 271

[56] References Cited

U.S. PATENT DOCUMENTS

| | | | |
|---|---|---|---|
| 3,330,815 | 6/1967 | McKeon et al. | 260/93.1 |
| 3,959,234 | 2/1976 | Kurosawa et al. | 260/78 |
| 4,166,083 | 3/1979 | Ueda et al. | 260/33.6 |

FOREIGN PATENT DOCUMENTS 1546775  8/1979  United Kingdom .

OTHER PUBLICATIONS

Michelotti et al., J. Polymer Science, 3, (1965), pp. 895–905.
Feast et al; *Metathesis Polymerization of Some Heteropolycyclic Alkenes;* J. Molecular Catalysis, 28, (1985), pp. 293–311.

*Primary Examiner*—Joseph L. Schofer
*Assistant Examiner*—Alex H. Walker
*Attorney, Agent, or Firm*—Thomas E. Kelley; Richard H. Shear

[57] ABSTRACT

Polymer comprising cyclopentanedioxocarbonyl vinylene units are prepared by ring opening metathesis polymerization of the endo stereoisomer of norbornene dioxocarbonyl monomer. Such polymers prepared in bulk or solution are useful as engineering thermoplastics for injection molding and solution casting. Such polymers can also be polymerized in molds.

1 Claim, No Drawings

CYCLOPENTANEDIOXOCARBONYL VINYLENE POLYMERS

BACKGROUND OF THE INVENTION

This is a continuation-in-part of application Ser. No. 07/054,656, filed May 27, 1987, incorporated herein by reference.

Disclosed herein are cyclopentanedioxocarbonyl vinylene polymers, methods of preparing such polymers from norbornene dioxocarbonyl and uses for such polymers.

As used herein the term "norbornene dioxocarbonyl" refers to 5,6-dioxycarbonyl 2.2.1] bicyclohept-2-ene which is prepared as the Diels-Alder adduct of cyclopentadiene and vinylene carbonate and which is identified as a substantially endo stereoisomer of the following structure

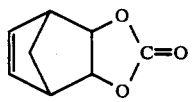

The term "endo" refers to the stereoisomer form of a monomer such as norbornene dioxocarbonyl in which the oxygen atoms and the double bond are both on the same side of the surface of the saturated five-membered ring of the monomer unit. Conversely, the term "exo" refers to the stereoisomeric form of such monomer units in which the oxygen atoms and the double bond are on opposite sides of the surface of the saturated five-membered ring of the monomer unit.

Feast et al. in *Journal of Molecular Catalysis*, 28, (1985) page 293, reported no success in preparing the homopolymer of the endo stereoisomer of norbornene dioxocarbonyl through metathesis ring-opening polymerization. Feast et al. did report limited success in copolymerizing norbornene with low levels (about 8%) of norbornene dioxocarbonyl and also speculated that the exo stereoisomer might be more readily polymerizable than the endo stereoisomer. In this regard it is believed that attempts to produce the exo stereoisomer by high temperature isomerization, e.g. by heating, will be generally unsuccessful with norbornene dioxocarbonyl because during such isomerization the shock-sensitive, e.g. unstable, vinylene carbonate will be generated.

Milner in British Patent Specification No. 1,546,775 claims a variety of norbornene polymers including polymers having monomer units of norbornene diol. However, Milner teaches only the production of the polymer of the mono hydroxyl substituted norbornene by hydrolysis of the mono ester, i.e. polynorbornene acetate.

Ueda et al. in U.S. Pat. 4,166,083 state that the polymers of an acetic acid ester of 5-norbornene-2,3-diol can be prepared by methods disclosed by Michelotti et al. *J. Polymer Sci*, 3, 895–905 (1965) which is limited to teaching the polymerization of norbornene and chloromethyl norbornene. Michelotti et al. failed to polymerize norbornene nitrile. Since there is no teaching of a generalized polymerization procedure for norbornene derivatives, Ueda et al. do not provide any enablement for the polymer of the diester of norbornene diol.

McKeon et al. in U.S. Pat. No. 3,330,815 disclose polymers of a variety of bicyclo norbornene derivative monomer units, e.g. 5,6-dihydroxybicyclo [2.2.1] hept-2-ene (referred to herein as norbornene diol) and the diesters. Such polymers are produced through a vinyl-type addition polymerization and not a metathesis ring opening polymerization.

SUMMARY OF THE INVENTION

This invention provides novel polymers comprising at least about 20 weight percent of cyclopentanedioxocarbonyl vinylene units of the formula

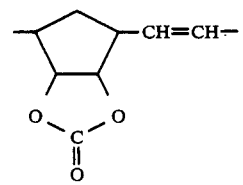

DETAILED DESCRIPTION OF THE INVENTION

The novel polymers of this invention are prepared by polymerizing endo stereoisomeric norbornene dioxocarbonyl by metathesis ring opening polymerization to provide a polymer having cyclopentanedioxocarbonyl vinylene units in high proportions. Such polymers are of the following structure:

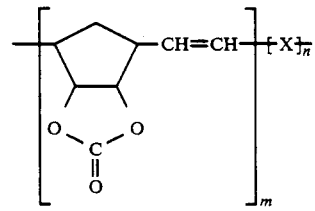

where X is derived from a metathesis copolymerizable monomer and the ratio $m/(m+n)$ is at least about 0.2.

As used herein "metathesis copolymerizable monomers" mean any of the well-known monomers that undergo metathesis ring-opening polymerization such as norbornene, and derivatives thereof, e.g. norbornene nitrile, dicyclopentadiene and the like.

Polymers comprising cyclopentanedioxocarbonyl vinylene units can be hydrolysed to provide polymers comprising cyclopentane diol vinylene units. The hydrolysis of the polymers to provide diol groups is readily effected through the use of alkaline agents such as potassium hydroxide.

The preparation of the polymers of this invention by metathesis ring opening polymerization is advantageously carried out at moderate temperatures, e.g. between about 25° C. and about 100° C. in a reaction medium comprising an aprotic solvent, e.g. chlorinated solvent such as dichloroethane, and which is devoid of water, alcohols, and the like which will readily deactivate common polymerization catalysts. Such catalysts are known in the art and are disclosed for instance in U.S. Pat. No. 3,959,234, incorporated herein by reference. A preferred catalyst comprises the reaction product of tungsten hexachloride and an acetal, e.g. 1,1-diethoxy ethane. Preferably, the polymerization reaction medium will also contain as an activator an aluminum alkyl such as diethyl aluminum chloride, triisobutyl aluminum or the like. Higher yields of polymers of higher inherent viscosity have been achieved with triisobutyl aluminum as the activator. The polymerization reaction medium should be kept dry and free of contaminants, e.g. water, alcohols, etc., that may interact with catalyst and/or activator to undesirably reduce the catalytic activity.

The polymers of this invention recovered from such polymerization solutions can be advantageously used as engineering thermoplastics to provide articles in a desired form by conventional thermoplastic processing, e.g. by injection molding or by casting from solution.

Alternatively, metathesis ring-opening polymerization is advantageously carried out as a bulk polymerization process, e.g. to provide articles by reaction injection molding. Bulk polymerization is especially useful for polymerization of norbornene dioxocarbonyl. Bulk polymerization is effectively carried out at moderate temperatures, e.g. between about 25° C. and about 150° C. (depending on the melting temperature of the monomer), utilizing catalysts and activators as described above.

The following disclosure is provided to illustrate specific embodiments and aspects of the polymers of this invention but is not intended to imply any limitation of the scope of this invention. Temperatures are reported in degrees Celsius.

EXAMPLE 1

This example serves to illustrate the preparation of norbornene dioxocarbonyl.

12.4 ml of dicyclopentadiene, 52.8 g of vinylene carbonate, and 0.4 g hydroquinone were added to 12.4 ml of toluene in a Parr reactor. The mixture was held at about 160° for about 18 hours. The temperature was reduced to about 45° and the pressure reduced to about 5 mm to remove residual vinylene carbonate. Norbornene dioxocarbonyl was recovered at about 100% yield by raising the solution temperature to about 130–140° and lowering the pressure to about 2 mm. Norbornene dioxocarbonyl, purified by recrystallization from carbon tetrachloride, exhibited a melting point of 114–115°.

EXAMPLE 2

This example serves to illustrate the solution polymerization of norbornene dioxocarbonyl.

A metathesis polymerization catalyst was prepared by dissolving 1.7 grams of tungsten hexachloride and 1.0 grams of 1,1-diethoxy ethane in about 8.6 ml of toluene to provide a 0.5 M catalyst solution based on tungsten. The catalyst and activator solutions are maintained under nitrogen atmosphere to avoid inactivation, e.g. by water and/or oxygen.

0.19 ml of activator solution comprising 2.05 M diethyl aluminum chloride in heptane and about 0.08 ml of the 0.5 M catalyst solution were added to a solution of 3.2 g norbornene dioxocarbonyl in 7 ml of 1,2-dichloro ethane. The solution was maintained at room temperature for about 24 hours, then combined with methanol to precipitate a polymer, which was recovered by filtration and dried (yield about 0.9 g). The polymer had an inherent viscosity of about 0.33 dl/g (measured on a 0.5 g/dl solution in DMF at 30°).

EXAMPLE 3

This example serves to illustrate the preparation of copolymers by bulk polymerization of norbornene dioxocarbonyl and norbornene nitrile.

2.9 g of norbornene dioxocarbonyl was dissolved in 5 ml of norbornene nitrile, e.g. at about 100°. 0.18 ml of 2.05 M diethyl aluminum chloride in heptane and 1.1 ml of 0.05 N solution of the adduct tungsten hexachloride and diethoxy ethane in norbornene nitrile were added to the solution of norbornene dioxocarbonyl in norbornene nitrile at 100°. The resultant polymer exhibited an inherent viscosity of 0.8 dl/g (as measured on a 0.5 g/dl solution in DMF at 25°).

EXAMPLE 4

This example serves to further illustrate the preparation of copolymers from norbornene dioxocarbonyl and norbornene nitrile.

Norbornene dioxocarbonyl, prepared essentially as indicated in Example 1, and norbornene nitrile (the Diels-Alder adduct of cyclopentadiene and acrylonitrile) were combined in solutions of 1,2-dichloroethane together with diethyl aluminum chloride activator (according to Example 3) and tungsten hexachloride catalyst (according to Example 4) in the proportions indicated in Table 1. I.R. analysis indicated that the resultant polymers contained both nitrile and carbonyl groups.

TABLE 1

| Norbornene Monomers Dioxocarbonyl | (m mol) Nitrile | Solvent (ml) Dichloroethane |
|---|---|---|
| 17.9 | 33.6 | 2 |
| 24.4 | 25.2 | 3 |
| 30.4 | 16.8 | 5 |
| 32.1 | 18.4 | 7 |

EXAMPLE 5

This example serves to illustrate the preparation of polymers of cyclopentane diol vinylene.

Polymer comprising dioxocarbonyl cyclopentane vinylene prepared essentially as indicated in Example 3 was dissolved in dimethyl sulfoxide to provide a polymer solution. A film (about 0.1 mm) was cast from the polymer solution and dried at 60° under a vacuum for about 24 hours. The film was then immersed in a 1 N sodium hydroxide solution for about 16 hours, washed in distilled water to pH 7, and dried under vacuum. Infrared spectroscopic analysis indicated substantial reduction of carbonyl groups and the appearance of absorption due to substantial increase in hydroxyl groups which is consistent with hydrolysis of polymer units of norbornene dioxocarbonyl groups to hydroxy groups.

While specific embodiments of the invention have been described, it should be apparent to those skilled in the art that various modifications thereof can be made without departing from the true spirit and scope of the invention. Accordingly, it is intended that the following claims cover all such modifications within the full inventive concept.

What is claimed is:
1. Poly(norborene dioxycarbonyl).

* * * * *